United States Patent
Ge et al.

(10) Patent No.: US 9,264,897 B2
(45) Date of Patent: Feb. 16, 2016

(54) PAIRING AND AUTHENTICATION PROCESS BETWEEN A HOST DEVICE AND A LIMITED INPUT WIRELESS DEVICE

(75) Inventors: Renwei Ge, San Diego, CA (US); Alexander Gantman, San Diego, CA (US); Arun Balakrishnan, San Diego, CA (US); Brian M. Rosenberg, San Diego, CA (US); Yinian Mao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 13/076,211

(22) Filed: Mar. 30, 2011

(65) Prior Publication Data

US 2012/0254987 A1    Oct. 4, 2012

(51) Int. Cl.
| | |
|---|---|
| *G06F 12/00* | (2006.01) |
| *G06F 12/14* | (2006.01) |
| *G11C 7/00* | (2006.01) |
| *H04W 12/06* | (2009.01) |
| *H04L 29/06* | (2006.01) |
| *H04M 1/05* | (2006.01) |
| *H04M 1/725* | (2006.01) |
| *G06F 11/30* | (2006.01) |
| *G06F 15/173* | (2006.01) |
| *H04M 1/60* | (2006.01) |

(52) U.S. Cl.
CPC .......... *H04W 12/06* (2013.01); *H04L 63/0492* (2013.01); *H04L 63/0861* (2013.01); *H04L 63/18* (2013.01); *H04M 1/05* (2013.01); *H04M 1/7253* (2013.01); *H04M 1/6066* (2013.01); *H04M 2250/12* (2013.01)

(58) Field of Classification Search
CPC ........ G06F 21/31; G06F 21/575; G06F 21/83
USPC .............. 726/19, 27, 2–8; 713/168–186, 150, 713/202; 715/853, 854; 709/206, 225, 229, 709/249, 389, 38
See application file for complete search history.

(56) References Cited

U.S. PATENT DOCUMENTS

| | | |
|---|---|---|
| 7,907,901 B1 | 3/2011 | Kahn et al. |
| 2003/0005085 A1 | 1/2003 | Matsuno |

(Continued)

FOREIGN PATENT DOCUMENTS

| | | |
|---|---|---|
| EP | 1528769 A2 | 5/2005 |
| EP | 1672844 A1 | 6/2006 |

(Continued)

OTHER PUBLICATIONS

International Search Report and Written Opinion—PCT/US2012/031546—ISA/EPO—Jul. 16, 2012.

*Primary Examiner* — Evans Desrosiers
(74) *Attorney, Agent, or Firm* — Won Tae C. Kim

(57) ABSTRACT

Disclosed is an apparatus and method to perform a pairing process with a limited input wireless device. A host device includes a transceiver and a processor. The processor may be configured to execute instructions to: receive from the transceiver a pairing process request from the limited input wireless device, wherein the pairing process request includes a private code based upon a physical user action implemented with the limited input wireless device; and implement a pairing process to validate the limited input wireless device for a particular host device function associated with the private code.

34 Claims, 4 Drawing Sheets

(56) References Cited

U.S. PATENT DOCUMENTS

| | | | |
|---|---|---|---|
| 2003/0083113 A1* | 5/2003 | Chua et al. | 455/569 |
| 2004/0121783 A1* | 6/2004 | Chua et al. | 455/456.1 |
| 2005/0202844 A1* | 9/2005 | Jabri et al. | 455/556.1 |
| 2006/0267860 A1* | 11/2006 | Rinaldo et al. | 345/1.2 |
| 2006/0281409 A1* | 12/2006 | Levien et al. | 455/41.2 |
| 2007/0003061 A1 | 1/2007 | Jung et al. | |
| 2007/0254709 A1* | 11/2007 | Higgins | 455/557 |
| 2009/0153342 A1* | 6/2009 | Thorn | G06F 1/1626 340/669 |
| 2010/0167646 A1 | 7/2010 | Alameh et al. | |
| 2011/0126009 A1* | 5/2011 | Camp et al. | 713/168 |
| 2011/0126014 A1* | 5/2011 | Camp et al. | 713/171 |
| 2011/0189981 A1* | 8/2011 | Faith et al. | 455/414.1 |
| 2012/0159599 A1* | 6/2012 | Szoke | G06F 21/35 726/7 |

FOREIGN PATENT DOCUMENTS

| | | |
|---|---|---|
| JP | 2005136871 A | 5/2005 |
| JP | 2005174327 A | 6/2005 |
| JP | 2006191569 A | 7/2006 |
| JP | 2009129111 A | 6/2009 |
| JP | 2011244439 A | 12/2011 |
| WO | 2008119050 A2 | 10/2008 |
| WO | 2010123204 A2 | 10/2010 |

* cited by examiner

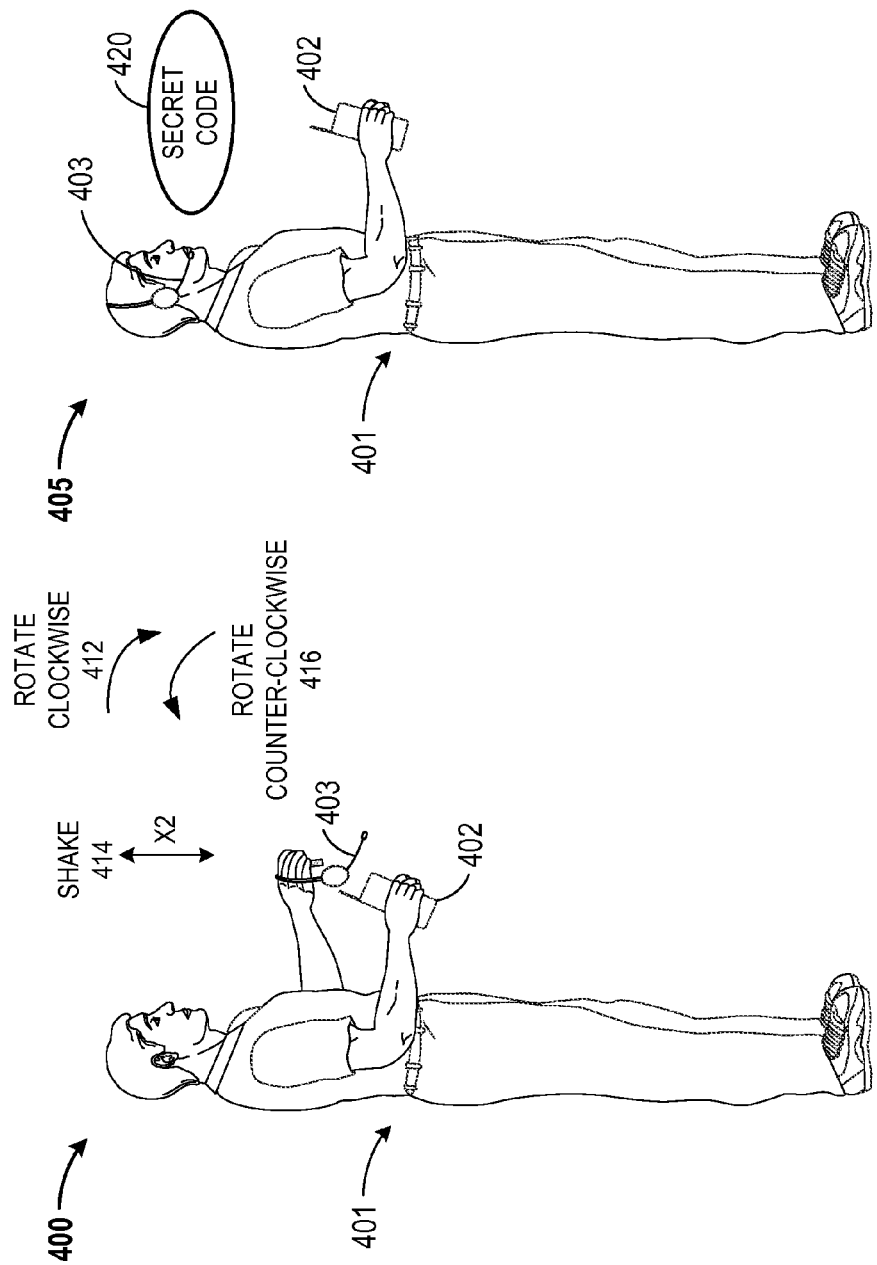

US 9,264,897 B2

PAIRING AND AUTHENTICATION PROCESS BETWEEN A HOST DEVICE AND A LIMITED INPUT WIRELESS DEVICE

BACKGROUND

1. Field

The present invention relates generally to a pairing and authentication process between a host device and a limited input wireless device.

2. Relevant Background

Today, the use of mobile electronic devices is widespread. Such mobile devices can provide a user with wireless phone access, Internet access, allow the user to perform on-line transactions such as on-line shopping, on-line banking, as well as other applications such as finding maps to particular locations, etc. Thus, today's mobile devices allow for wireless communication as well as almost all of the Internet features associated with non-mobile computer systems. Examples of such mobile electronic devices include: mobile devices, smart phones, cellular phones, personal digital assistants (PDAs), digital cameras, mobile computers, etc.

Differing digital wireless network standards often include a security measure to ensure that two devices that are in operative reach of each other are mutually accepted. This procedure is termed pairing and may involve the exchange of a passkey.

For example, an initial pairing is typically implemented between a host device and a limited input wireless device such that the limited input wireless device is allowed to gain access to functions of the host device. In order to make sure that an intended limited input wireless device is paired, typically a code, such as a PIN, is automatically transmitted from the limited input wireless device to the host device. An example of this would be a mobile phone and a limited wireless headset device (e.g. a BLUETOOTH headset) being paired together. Because limited input wireless devices are typically small and typically only have one or two available buttons (or none at all), a user typically has no way to enter a secure private code or key on the limited input wireless device in order to pair with the host device in a secure manner such that the user has a particular user-defined private key to securely authenticate the user to the host device.

Unfortunately, with typical limited input wireless devices, the pairing operation is simply implemented by the limited input wireless device transmitting a pre-set code, such as the PIN, to the host device. In other words, the PIN or some other pre-set code is used as the security code. After that, anyone using the limited wireless input device can access the functions of the host device. For example, when a BLUETOOTH headset is paired with a cellular phone, the PIN is automatically transmitted and is used as the security code during the pairing process, such that anyone can use the BLUETOOTH headset with the cellular phone after pairing.

Therefore, there is a need for a limited input wireless device that can be paired with the host device based upon a secret code or key entered by the user such that the limited input wireless device can thereafter be authenticated by the host device to utilize its functions based upon the secret key entered by the user.

SUMMARY

Aspects of the invention may relate to an apparatus, system, and method to perform a pairing process with a limited input wireless device. In one aspect, a host device includes a transceiver and a processor. The processor may be configured to execute instructions to: receive from the transceiver a pairing process request from the limited input wireless device, wherein the pairing process request includes a private code based upon a physical user action implemented with the limited input wireless device; and implement a pairing process to validate the limited input wireless device for a particular host device function associated with the private code.

Aspects of the invention may also relate to an apparatus, system, and method in which a limited input wireless device or a host device defines a private code based upon a physical user action; and either the limited input wireless device or the host device may be validated as part of a pairing process based upon the private code.

BRIEF DESCRIPTION OF THE DRAWINGS

FIG. 4A is a diagram of an example in which the host device is a mobile device and the limited input wireless device is a headset and the user uses a particular motion for a private code.

FIG. 4B is a diagram of an example in which the host device is a mobile device and the limited input wireless device is a headset and the user uses a particular verbal sound for a private code.

DETAILED DESCRIPTION

The word "exemplary" is used herein to mean "serving as an example, instance, or illustration." Any embodiment described herein as "exemplary" or "example" is not necessarily to be construed as preferred or advantageous over other embodiments.

Figure 1:
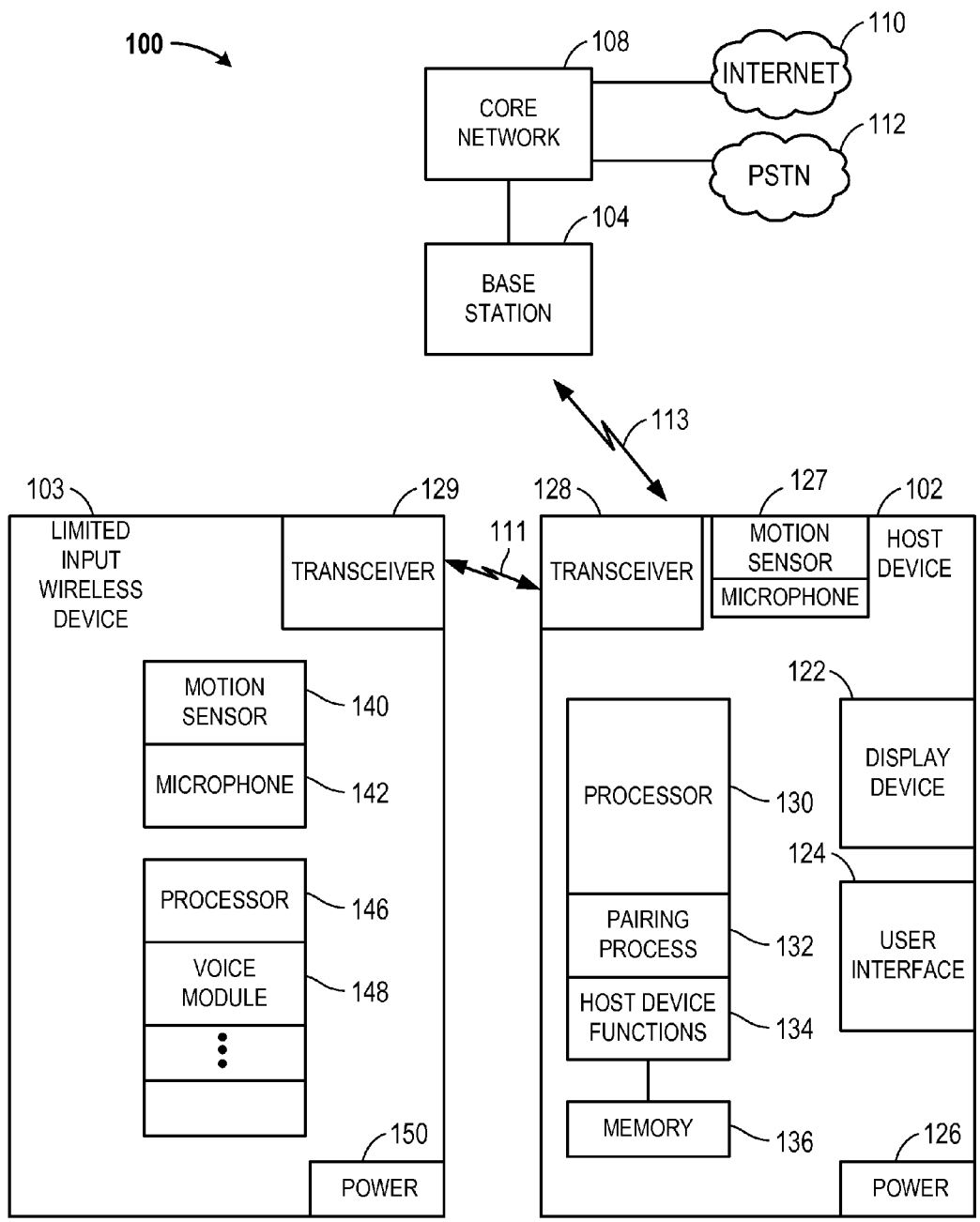
FIG. 1 is a block diagram of a system in which embodiments of the invention may be practiced.

With reference to FIG. 1, FIG. 1 is a block diagram of a system 100 in which embodiments of the invention may be practiced. In particular, system 100 illustrates a host device 102 that may perform a pairing process with a limited input wireless device 103. Host device 102 may include a processor 130, a memory 136, a display device 122, a user interface 124, a power source 126, and a transceiver 128. It should be appreciated that the display device 122 is a typical display device on a host device 102 such as a cell phone, mobile device, personal digital assistant, mobile computer, etc. However, host device 102 may be any electronic device mobile or non-mobile, as will be described. User interface 124 may be a keyboard or another type of user interface input device. Power device 126 may be a battery device to power host device 102.

In particular, host device 102 may include a processor 130 configured to execute instructions for implementing a pairing and authentication process 132 as well as host device functions 134. Memory 136 may be coupled to the processor 130 to store the instructions for implementation by the processor 130. Thus, host device 102 is configured to execute instructions to: receive from the transceiver 128 a pairing process request from the limited input wireless device 130 via wireless link 111, wherein the pairing process request includes a private code based upon a physical user action implemented with the limited input wireless device 103; and implementing a pairing process 132 to validate the limited input wireless device 103 for a particular host device function 134 associated with the private code. The private code being based upon physical user action implemented with the limited input wireless device 103.

Further, the processor 130 may implement particular host device functions 134 (e.g., voice transmissions, data transmissions, emails, on-line purchases, etc.) for the limited input wireless device 103 based upon receipt and authentication of the private code from the physical user action implemented with the limited input wireless device 103 after it has been previously paired and thereafter authenticated by pairing and authentication process 132.

The limited input wireless device 103 is likewise utilized to perform the pairing process with the host device 102. The limited input wireless device 103 may include a transceiver 129 and may receive a private code based upon a physical user action implemented with the limited input wireless device 103 and may transmit the private code through the transceiver 129 via wireless communication link 111 to the transceiver 128 of the host device 102. As previously described, the host device 102 may implement a pairing and authentication process to validate the limited input wireless device 103 for a particular host device function associated with a private code.

The limited input wireless device 103 may include different types of mechanisms for a user to initially pair itself with the host device 102 and further thereafter to authenticate itself based upon a private code. The private code may be defined by a physical user action implemented by the limited input wireless device 103 such that the user of the limited input wireless device 103 can utilize particular host device functions associated with the private code.

For example, the limited input wireless device 103 may include a motion sensor 140 to detect motion from the user. The physical user action used to define the private code may be a particular movement of the limited input wireless device 103 detected by the motion sensor 140 and selected by the user in the pairing process. The motion based private code is transmitted via link 111 to the host device 102. As particular examples, the motion sensor 140 may include an accelerometer, digital compass, and/or a gyroscope.

As another example, the limited input wireless device 103 may include a microphone 142 and a voice module 148 implemented by processor 146 to record the voice of a user from the microphone 142 such that it can be transmitted via link 111 to the host device 102. Thus, the physical user action that is used to define the private code may be a verbal sound spoken by the user to the limited input wireless device 103 in the pairing process. As examples, the verbal sound may be a letter, a number, a word, a sound, and/or various combinations thereof.

Additionally, limited input wireless device 103 may include common electronic devices such as power 150, memory, user interfaces such as buttons, etc. Further, the limited input wireless device 103 may perform many of the previously-described functions performed by the host device by executing its own instructions by processor 146.

As previously described, a private code is defined based upon a physical user action implemented with the limited input wireless device 103 and the limited input wireless device 103 is validated for a particular host device function implemented by the host device 102 associated with the private code. However, it should be appreciated that the private code may be defined by either one of the limited input wireless device 103 or the host device 102 and the private code may be authenticated or validated by either one of the limited input wireless device 103 or the host device 102.

For example, the private code may be defined by the host device 102 and may be transmitted via link 111 and validated at the limited input wireless device 103. The host device may include a motion sensor and microphone 127 similar to the limited wireless access device 103. As one example, the host device 102 may define a verbal sound (e.g., letter, number, word, sound, combinations thereof, etc.) using microphone 127 and this verbal sound is then validated by the limited input wireless device 103. Thereafter, the particular host device functions implemented by the host device 102 may be utilized after the verbal sound is spoken to the limited input wireless device 103.

As another example, the private code based upon a physical user motion may be defined by the host device 102 utilizing motion sensor 127 and may be transmitted via link 111 and validated at the limited input wireless device 103. As one example, the host device 102 may define a particular physical movement (e.g., shake up and down twice, rotate 90 degrees left and 90 degrees right) and this particular movement is then validated by the limited input wireless device 103. Thereafter, the particular host device functions implemented by the host device 102 may be utilized after the physical motion is implemented upon the limited input wireless device 103.

Therefore, a private code may be defined by a physical user action at either one of the host device 102 or the limited input wireless device 103 and may be validated by either one of the host device 102 or the limited input wireless device 103. Afterwards, particular host device functions for the input wireless device 103 may be implemented by the host device 102 based upon authentication of the private code by either the host device 102 or the limited input wireless device 103.

It should be appreciated that embodiments of the invention as will be hereinafter described may be implemented in conjunction with the execution of instructions by processor 130 of host device 102 and/or processor 146 of limited input wireless device 103 and/or other circuitry of host device 102 and limited input wireless device 103 and/or other devices. Particularly, circuitry of host device 102 and limited input wireless device 103 including but not limited to processors 130 and 146, may operate under the control of a program, routine, or the execution of instructions to execute methods or processes in accordance with embodiments of the invention. For example, such a program may be implemented in firmware or software (e.g. stored in memory and/or other locations) and may be implemented by processors, such as processors 130 and 146, and/or other circuitry. Further, it should be appreciated that the terms processor, microprocessor, circuitry, controller, etc., refer to any type of logic or circuitry capable of executing logic, commands, instructions, software, firmware, functionality, etc.

Further, host device 102, when utilized as a mobile or wireless device, may communicate via one or more wireless communication links 113 that are based on or otherwise support any wireless communication technology. For example, in some aspects, a wireless device may be associated with a network including a base station 104, a core network 108, the Internet 110, and a Public Switched Telephone Network (PSTN) 112.

Figure 2:
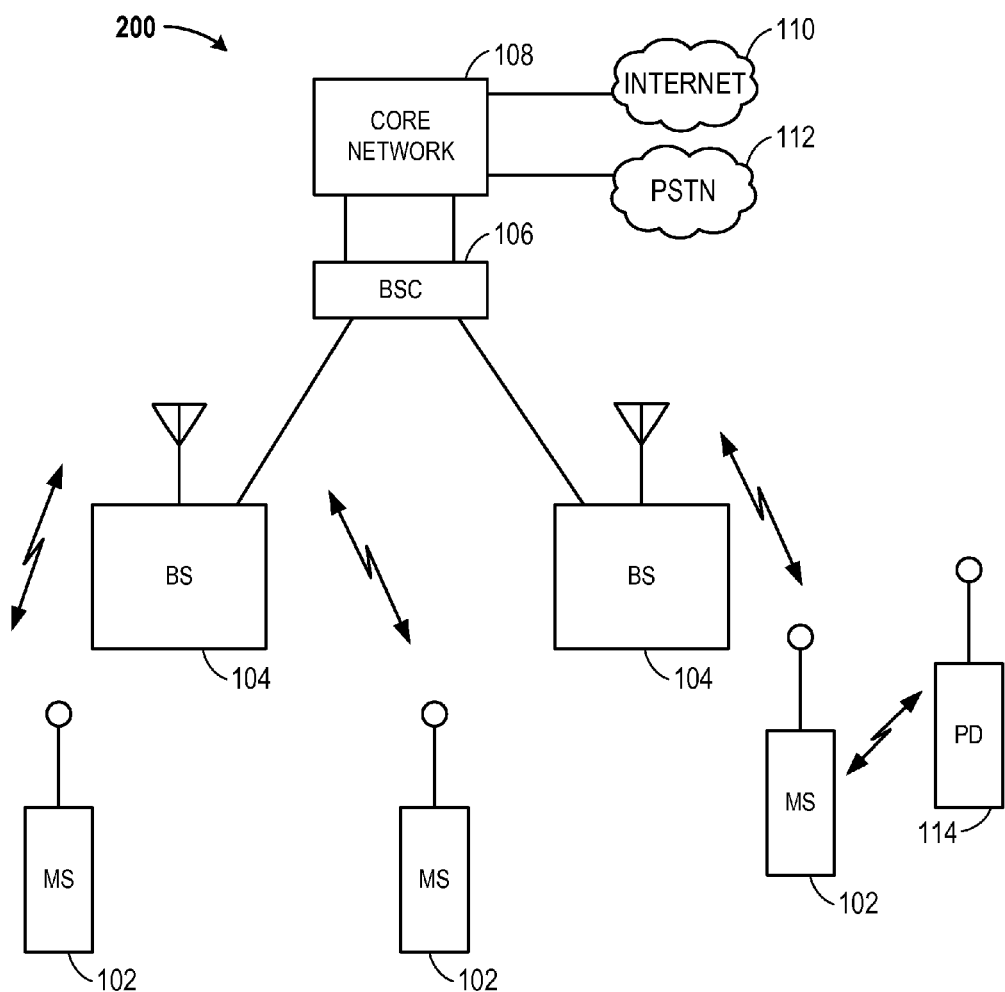
FIG. 2 is a block diagram of an example of a wireless communication system.

With reference to FIG. 2, a wireless mobile station (MS) 102 may communicate with one or more base stations (BS) 104 of a wireless communication system 200. The MS may further pair with a wireless peer device 114. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device, 102 or 114, may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

With reference again to FIG. 1, as will be hereinafter described, embodiments of the invention leverage some forms of user actions that are detected by the limited input wireless device 103, which are interpreted and processed by the limited input wireless device 103 as a private code, and the private code is then transmitted via wireless link 111 to the host device 102. In particular, because the host device 102 has prior knowledge of the private code, which may be selected by the user beforehand as part of the pairing process with the host device 102, the host device 102 can thereafter compare the private code and authenticate it and determine if unlocking the particular host device functions is permissible for the limited input wireless device 103. Thus, as will be described, a particular sound or movement of the limited input wireless device 103 may unlock the host device 102 and allow particular functions to be implemented by the host device (e.g., voice transmissions, data transmissions, emails, on-line purchases, etc.)

Figure 3:
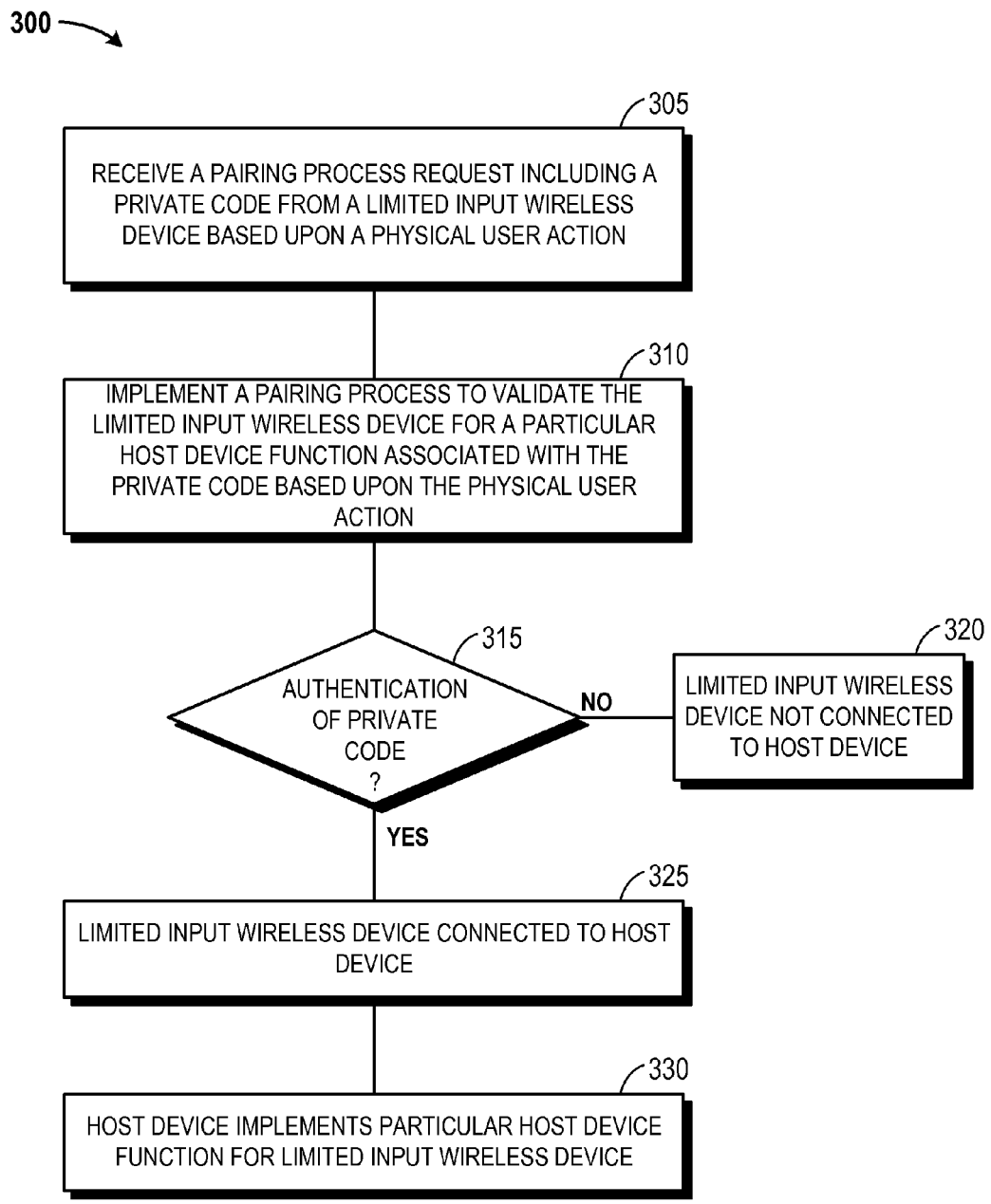
FIG. 3 is a flow diagram that illustrates a process to perform a pairing and authentication process between a host device and a limited input wireless device.

With brief reference to FIG. 3, a flow diagram is shown to illustrate a process 300 to perform a pairing and authentication process between a host device and a limited input wireless device. At block 302, a host device receives a pairing process request including a private code from a limited input wireless device based upon a physical user action (e.g., a movement of the limited input wireless device or a verbal sound). Next, at block 310, the host device implements a pairing process to validate the limited input wireless device for a particular host device function associated with the private code based upon the physical user action implemented with the limited input wireless device. Thus, at this point, a private code has been paired between the limited input wireless device and the host device for a particular host device function. A user of the limited input wireless device can now validate itself with the physical user action to the host device and, if it is properly authenticated, can perform the particular host device function.

Next, at decision block 315, it is determined whether a received private code based upon a physical user action implemented with the limited input wireless device is authenticated by the host device. If not, the limited input wireless device is not connected to the host device and is not allowed to use the host device function. Thus, the host device is not un-locked for the limited input wireless device. However, if the private code from the physical user action implemented with the limited input wireless device is authenticated by the host device, the limited input wireless device is connected to the host device (block 325), the host device is unlocked, and the host device can implement the particular host device functions associated with the private code for the limited input wireless device based upon input from the limited input wireless device (block 330).

As particular examples, the limited input wireless device 103 may be a headset (e.g. BLUETOOTH) and may include a user interface with only one or two buttons. Further, the host device 102 may be a mobile device, such as, a cellular phone. However, it should be appreciated that many other examples may be utilized. For example, the limited input wireless device 103 may be a wireless vehicle key, a wireless printer, or a wireless fitness device. As other examples, the host device 102 may be a vehicle, a computer, or fitness equipment.

Particular examples will be hereinafter discussed.

With reference to FIG. 4A, an example 400 is shown in which the host device is a mobile device 402 and the limited input wireless device 403 is a headset. In this example, motion based detection may be utilized by the headset 403 to implement a private code. The headset 403 may include a motion sensor (e.g., an accelerometer, digital compass, or a gyroscope) that can detect a sequence of user-provided motions. For example, the user 401 may first rotate the headset clockwise 412 to the 9 o'clock position, shake it twice 414, then rotate it counter-clockwise 416 to the 12 o'clock position, etc. This sequence of rotations may be detected by the motion sensor of the headset 403, processed by the processor, and transmitted via the transceiver to the mobile device 402. It should be appreciated that any sort of motion sequence may be utilized.

This private code based upon the motion implemented by the limited input wireless device 403 may be utilized in the pairing process to validate the headset 403 with the mobile device 402 such that a particular host device function associated with the private code is accepted by the mobile device 402. Thereafter, the user 401 may utilize this motion-based private code to authenticate itself with the mobile device 402 for certain types of functions. As in this example, the user 401 may authenticate itself with a motion based private code to enable voice transmission for phone calls utilizing the mobile device 402. However, it should be appreciated that a wide variety of different functions may be utilized, such as, data transmission, emails, on-line purchases, etc. In other embodiments, as previously described, the motion-based private code may be defined by the mobile device 402 and may be transmitted to and validated at the headset 403.

As another example, a voice-based detection may be utilized by the limited input wireless device to implement the private code. With reference to FIG. 4B, FIG. 4B is an example 405 that illustrates a user 401 with a headset 403 utilizing a secret code 420 to pair itself and authenticate itself with a mobile device 402. In this instance, the headset 403 may be equipped with a microphone and a voice recognition module implemented by a processor to record the voice of a user from the microphone and turned it into a private code, as has been previously described. A wide variety of examples may be utilized. For example, the verbal sound may include a letter, number, word, sound, or combinations thereof.

This private code may be transmitted from the headset 403 to the mobile device 402 to initially pair itself and thereafter validate itself via authentication with the mobile device 402. As an example, the headset may utilize a person's name, number, or a very particular sound to create a private code by which to authenticate the user 401 to the mobile device 402 so that only that person can utilize the headset 403 in utilizing the mobile device 402 for phone conversations. However, it should be appreciated that a wide variety of different functions may be utilized, such as, date transmissions, emails, on-line purchases, etc. In another embodiment, as previously described, the sound-based private code may be defined by the mobile device 405 and may be transmitted to and validated at the headset 403.

Therefore, a private code may be defined by a physical user action at either one of the mobile device 402 or the headset 403 and may be validated by either one of the mobile device 402 or the headset 403. Afterwards, particular host device functions for the headset may be implemented by the headset 403 based upon authentication of the private code by either the mobile device 402 or the headset 403.

Thus, as previously described, embodiments of the invention leverage some forms of user actions that are detected by the limited input wireless device 403 which are interpreted and processed by the limited input wireless device as a private code, and the private code is then transmitted to the host device 402. In particular, because the host device 402 has prior knowledge of the private code, which is selected by the user beforehand as part of the pairing process with the host device 402, the host device 402 can compare the private code, determine if unlocking the particular host device 402 functions is permissible for the limited input wireless device 403, and allow the host device 402 to implement functions for the limited input wireless device 403.

Further, it should be appreciated that the processor of the host device 402 may implement different types of host device functions for the limited input wireless device 403 based upon receipt and authentication of different private codes based upon different types of physical user actions implemented with the limited input wireless device 403, such that some host device functions may be lower security functions requiring a lower security private code from the limited input wireless device 403 and some host device functions are higher security functions requiring a higher security private code from the limited input wireless device 403.

For example, less sensitive functionalities (e.g., voice transmission for cellular phone calls) for a mobile device 402 can be grouped into one profile requiring one type of private code (e.g., a simple motion based private code) from the limited input wireless device 103 whereas more sensitive functions (e.g., voice based bank transactions or emails) may require a more secure private code (e.g., a complex voice based password). Moreover, by requiring private codes by the limited input wireless device 403, if the limited input wireless device 403 and/or the mobile device 402 are stolen, significant protection is provided against misuse.

In essence, embodiments of the invention leverage user action at a limited input wireless device (e.g., motion and/or voice) as a way to generate a private code to pair with the host device and to set up a private code in the security profile at the host device. In this way, after pairing, the host device can implement particular host device functions (e.g., voice transmission for cellular phone calls, emails, voice based bank transactions, voice based purchase transactions, data transmissions, etc.) for the limited input wireless device based upon receipt and authentication of the private code from physical user action (e.g. motion and voice) implemented by the limited input wireless device.

Further, it should be appreciated that although examples of a headset and a mobile phone device have been described, embodiments of the invention may be utilized with other implementations. For example, the limited input wireless device may be a wireless vehicle key, a wireless printer, or a wireless fitness device whereas the host device may be a vehicle, a computer, or fitness equipment. As one example, the limited input wireless device may be a wireless vehicle key whereas the host device is a vehicle door such that the user by implementing a previously paired motion or voice based private code may automatically open the vehicle door.

As another example, the limited input wireless device may be a wireless printer whereas the host device is a mobile or non-mobile computer such that the user by implementing a previously paired motion or voice based private code may utilize the computer for printing. As yet another example, the limited input wireless device may be a wireless fitness device, such as a heart monitor, whereas the host device is a type of fitness equipment (e.g., a treadmill) such that the user by implementing a previously paired motion or voice based private code may set up the heart monitor with the fitness equipment. Accordingly, there are a huge variety of implementations between input wireless devices and host devices that may be utilized with embodiments of the invention.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A host device to perform a pairing process with a limited input wireless device comprising:
    a transceiver; and
    a processor to:
    define a private code based upon a user selected physical user action including a sequence of one or more types of user-selected movements comprising at least one of a rotation or a shake;
    receive from the transceiver a pairing process request from the limited input wireless device after the private code is defined, wherein the pairing process request includes the private code based upon the physical user action implemented with the limited input wireless device detected by a motion sensor of the limited input wireless device to detect motion from the user;
    implement a pairing process to validate the limited input wireless device for a particular host device function associated with the private code by validating the private code included in the pairing process request; and
    implement the particular host device function for the limited input wireless device based upon receipt and authentication of the private code, wherein different types of host device functions for the limited input wireless device are implementable based upon receipt and authentication of different private codes from physical user action implemented with the limited input wireless device, such that some host device functions are lower security functions requiring a lower security private code from the limited input wireless device and some host device functions are higher security functions requiring a higher security private code from the limited input wireless device.

2. The host device of claim 1, wherein, the motion sensor includes at least one of an accelerometer, digital compass, or a gyroscope.

3. The host device of claim 1, wherein, the limited input wireless device includes a microphone and a voice module to record the voice of a user from the microphone for transmission to the host device, wherein the physical user action to define the private code further includes a verbal sound spoken by the user to the limited input wireless device.

4. The host device of claim 3, wherein, the verbal sound includes at least one of a letter, number, word, or sound.

5. The host device of claim 1, wherein the limited input wireless device is a headset.

6. The host device of claim 1, wherein the limited input wireless device includes a user interface with at least one button.

7. A method to validate a limited input wireless device with a host device comprising:
defining a private code based upon a user selected physical user action including a sequence of one or more types of user-selected movements comprising at least one of a rotation or a shake detected by a motion sensor;
validating the limited input wireless device with the host device based upon validation of the private code in a pairing process in response to a pairing process request after the private code is defined such that the limited input wireless device is allowed to utilize a particular host device function associated with the private code; and
implementing the particular host device function for the limited input wireless device based upon receipt and authentication of the private code, wherein different types of host device functions for the limited input wireless device are implementable based upon authentication of different private codes from physical user action implemented with the limited input wireless device, such that some host device functions are lower security functions requiring a lower security private code from the limited input wireless device and some host device functions are higher security functions requiring a higher security private code from the limited input wireless device.

8. The method of claim 7, wherein the private code is defined by one of the limited input wireless device or the host device.

9. The method of claim 7, wherein the limited input wireless device validates the host device based upon the private code or the host device validates the limited input wireless device based upon the private code.

10. The method of claim 7, wherein, the limited input wireless device includes a microphone and a voice module to record the voice of a user from the microphone for transmission to the host device, wherein the physical user action to define the private code further includes a verbal sound spoken by the user to the limited input wireless device.

11. The method of claim 10, wherein, the verbal sound includes at least one of a letter, number, word, or sound.

12. The method of claim 7, wherein the limited input wireless device is a headset.

13. The method of claim 7, wherein the limited input wireless device includes a user interface with at least one button.

14. A host device to perform a pairing process with a limited input wireless device comprising:
means for defining a private code based upon a user selected physical user action including a sequence of one or more types of user-selected movements comprising at least one of a rotation or a shake;
means for receiving from a transceiver a pairing process request from the limited input wireless device after the private code is defined, wherein the pairing process request includes the private code based upon the physical user action implemented with the limited input wireless device detected by a means for motion sensing of the limited input wireless device to detect motion from the user;
means for implementing a pairing process to validate the limited input wireless device for a particular host device function associated with the private code by validating the private code included in the pairing process request; and
means for implementing the particular host device function for the limited input wireless device based upon receipt and authentication of the private code, wherein different types of host device functions for the limited input wireless device are implemented based upon receipt and authentication of different private codes from physical user action implemented with the limited input wireless device, such that some host device functions are lower security functions requiring a lower security private code from the limited input wireless device and some host device functions are higher security functions requiring a higher security private code from the limited input wireless device.

15. The host device of claim 14, wherein, the means for motion sensing includes at least one of an accelerometer, digital compass, or a gyroscope.

16. The host device of claim 14, wherein, the limited input wireless device includes a microphone and a means for voice recording to record the voice of a user from the microphone for transmission to the host device, wherein the physical user action to define the private code further includes a verbal sound spoken by the user to the limited input wireless device.

17. The host device of claim 16, wherein, the verbal sound includes at least one of a letter, number, word, or sound.

18. The host device of claim 14, wherein the limited input wireless device is a headset.

19. The host device of claim 14, wherein the limited input wireless device includes a user interface with at least one button.

20. A computer program product to validate a limited input wireless device with a host device comprising:
a non-transitory computer-readable medium comprising code for:
defining a private code based upon a user selected physical user action including a sequence of one or more types of user-selected movements comprising at least one of a rotation or a shake detected by a motion sensor;
validating the limited input wireless device with the host device based upon validation of the private code in a pairing process in response to a pairing process request after the private code is defined such that the limited input wireless device is allowed to utilize a particular host device function associated with the private code; and
implementing the particular host device function for the limited input wireless device based upon receipt and authentication of the private code, wherein different types of host device functions for the limited input wireless device are implementable based upon authentication of different private codes from physical user action implemented with the limited input wireless device, such that some host device functions are lower security functions requiring a lower security private code from the limited input wireless device and some host device functions are higher security functions requiring a higher security private code from the limited input wireless device.

21. The computer program product of claim 20, wherein the private code is defined by one of the limited input wireless device or the host device.

22. The computer program product of claim 20, wherein the limited input wireless device validates the host device based upon the private code or the host device validates the limited input wireless device based upon the private code.

23. A limited input wireless device to perform a pairing process with a host device, the limited input wireless device comprising:
- a transceiver; and
- a processor to:
  - define a private code based upon a user selected physical user action implemented at the host device, the physical user action including a sequence of one or more types of user-selected movements comprising at least one of a rotation or a shake;
  - receive from the transceiver a pairing process request from the host device after the private code is defined, wherein the pairing process request includes the private code based upon the physical user action implemented with the host device by a motion sensor of the host device to detect motion from the user;
  - implement a pairing process to validate the host device for a particular limited input wireless device function associated with the private code by validating the private code included in the pairing process request; and
  - implement the particular limited input wireless device function for the host device based upon receipt and authentication of the private code, wherein different types of limited input wireless device functions are implemented based upon different private codes from physical user action implemented with the host device, such that some limited input wireless device functions are lower security functions requiring a lower security private code and some limited input wireless device functions are higher security functions requiring a higher security private code.

24. The limited input wireless device of claim 23, wherein, the motion sensor includes at least one of an accelerometer, digital compass, or a gyroscope.

25. The limited input wireless device of claim 23, wherein the host device further comprises a microphone and a voice module to record the voice of a user from the microphone for transmission to the limited input wireless device, wherein the physical user action to define the private code further includes a verbal sound spoken by the user to the host device in the pairing process.

26. The limited input wireless device of claim 25, wherein, the verbal sound includes at least one of a letter, number, word, or sound.

27. The limited input wireless device of claim 23, wherein the limited input wireless device is a headset.

28. The limited input wireless device of claim 23, wherein the limited input wireless device includes a user interface with at least one button.

29. A method for a limited input wireless device to perform a pairing process with a host device comprising:
- defining a private code based upon a user selected physical user action implemented at the host device, the physical user action including a sequence of one or more types of user-selected movements comprising at least one of a rotation or a shake;
- receiving a pairing process request from the host device after the private code is defined, wherein the pairing process request includes the private code based upon the physical user action implemented with the host device by a motion sensor of the host device to detect motion from the user;
- implementing a pairing process to validate the host device for a particular limited input wireless device function associated with the private code by validating the private code included in the pairing process request; and
- implementing the particular limited input wireless device function for the host device based upon receipt and authentication of the private code, wherein different types of limited input wireless device functions are implemented based upon different private codes from physical user action implemented with the host device, such that some limited input wireless device functions are lower security functions requiring a lower security private code and some limited input wireless device functions are higher security functions requiring a higher security private code.

30. The method of claim 29, wherein, the motion sensor includes at least one of an accelerometer, digital compass, or a gyroscope.

31. The method of claim 29, wherein the host device further comprises a microphone and a voice module to record the voice of a user from the microphone for transmission to the limited input wireless device, wherein the physical user action to define the private code further includes a verbal sound spoken by the user to the host device in the pairing process.

32. The method of claim 31, wherein, the verbal sound includes at least one of a letter, number, word, or sound.

33. The method of claim 29, wherein the limited input wireless device is a headset.

34. The method of claim 29, wherein the limited input wireless device includes a user interface with at least one button.

* * * * *